US011231083B2

(12) United States Patent
Kojima

(10) Patent No.: US 11,231,083 B2
(45) Date of Patent: Jan. 25, 2022

(54) ANTI-VIBRATION DEVICE

(71) Applicant: BRIDGESTONE CORPORATION, Tokyo (JP)

(72) Inventor: Hiroshi Kojima, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 103 days.

(21) Appl. No.: 16/605,666

(22) PCT Filed: Jan. 16, 2018

(86) PCT No.: PCT/JP2018/000994
§ 371 (c)(1),
(2) Date: Oct. 16, 2019

(87) PCT Pub. No.: WO2018/225289
PCT Pub. Date: Dec. 13, 2018

(65) Prior Publication Data
US 2020/0116226 A1   Apr. 16, 2020

(30) Foreign Application Priority Data

Jun. 9, 2017  (JP) .............................. JP2017-114183

(51) Int. Cl.
*F16F 13/16* (2006.01)
*F16F 13/14* (2006.01)

(52) U.S. Cl.
CPC .......... *F16F 13/16* (2013.01); *F16F 13/1463* (2013.01); *F16F 13/1481* (2013.01); *F16F 2222/12* (2013.01); *F16F 2230/20* (2013.01)

(58) Field of Classification Search
CPC .... F16F 13/16; F16F 13/1481; F16F 13/1463; F16F 2230/20; F16F 2222/12
See application file for complete search history.

(56) References Cited

U.S. PATENT DOCUMENTS

| 4,936,556 A | * | 6/1990 | Makibayashi | .......... F16F 13/16 267/140.13 |
| 5,172,893 A | | 12/1992 | Bouhier et al. | |

(Continued)

FOREIGN PATENT DOCUMENTS

| CN | 104343887 A | 2/2015 |
| JP | 59-037349 A | 2/1984 |

(Continued)

OTHER PUBLICATIONS

International Search Report for PCT/JP2018/000994 dated Mar. 13, 2018 [PCT/ISA/210].

(Continued)

*Primary Examiner* — Xuan Lan Nguyen
(74) *Attorney, Agent, or Firm* — Sughrue Mion, PLLC

(57) ABSTRACT

In the present invention, any two of a second liquid chamber (27), a third liquid chamber (28), and a fourth liquid chamber (29) communicate with each other through a first restricted passage (31) formed in an outer attachment member (11), an inner attachment member (12) or a partition member (15), and the remaining one liquid chamber communicates with a fifth liquid chamber (32) formed in the outer attachment member (11), the inner attachment member (12) or the partition member (15), the remaining one liquid chamber is divided in a circumferential direction, and each of the liquid chambers divided in the circumferential direction and the fifth liquid chamber (32) separately communicate with each other through a second restricted passage (33) formed in the outer attachment member (11), the inner attachment member (12) or the partition member (15).

8 Claims, 3 Drawing Sheets

(56) References Cited

U.S. PATENT DOCUMENTS

| | | | | | |
|---|---|---|---|---|---|
| 5,195,728 | A | * | 3/1993 | Skipper | B62D 33/0608 |
| | | | | | 267/140.12 |
| 5,531,426 | A | * | 7/1996 | Bruhl | F16F 13/16 |
| | | | | | 267/140.12 |
| 6,386,529 | B2 | * | 5/2002 | Bik | F16F 13/16 |
| | | | | | 267/140.13 |
| 6,644,635 | B2 | * | 11/2003 | Breitfeld | F16F 13/16 |
| | | | | | 267/140.12 |
| 8,297,602 | B2 | * | 10/2012 | Kojima | F16F 13/1463 |
| | | | | | 267/140.12 |
| 2015/0041617 | A1 | | 2/2015 | Okumura et al. | |
| 2015/0123327 | A1 | | 5/2015 | Saito et al. | |

FOREIGN PATENT DOCUMENTS

| | | | | | |
|---|---|---|---|---|---|
| JP | 60-139942 | A | | 7/1985 | |
| JP | 60-179540 | A | | 9/1985 | |
| JP | 63-266240 | A | | 11/1988 | |
| JP | 01-135940 | A | | 5/1989 | |
| JP | 04-362332 | A | | 12/1992 | |
| JP | 2013-245722 | A | | 12/2013 | |
| JP | 2017044221 | A | * | 3/2017 | F16F 13/14 |

OTHER PUBLICATIONS

Search Report dated Aug. 31, 2020 in Chinese Application No. 201880028631.0.
Extended European Search Report dated Feb. 2, 2021 from the European Patent Office in EP Application No. 18814090.9.

* cited by examiner

ANTI-VIBRATION DEVICE

CROSS REFERENCE TO RELATED APPLICATIONS

This application is a National Stage of International Application No. PCT/JP2018/000994, filed on Jan. 16, 2018, which claims priority from Japanese Patent Application No. 2017-114183, filed on Jun. 9, 2017.

TECHNICAL FIELD

The present invention relates to an anti-vibration device which is applied to, for example, an automobile, an industrial machine, and the like, and absorbs and attenuates vibration of a vibration generation portion such as an engine.

Priority is claimed on Japanese Patent Application No. 2017-114183, filed Jun. 9, 2017, the content of which is incorporated herein by reference.

BACKGROUND ART

In the related art, an anti-vibration device is known which includes a cylindrical outer attachment member connected to one of a vibration generation portion and a vibration reception portion, an inner attachment member connected to the other thereof and disposed inside of the outer attachment member, a main rubber body which connects the outer attachment member and the inner attachment member and closes an opening portion on one side in an axial direction along a central axis of the outer attachment member, a diaphragm which closes an opening portion on the other side in the axial direction in the outer attachment member, and a partition member which divides a liquid chamber in the outer attachment member into a main liquid chamber having the main rubber in a part of the partition wall and an auxiliary liquid chamber having the diaphragm in a part of the partition wall.

As the anti-vibration device of this type, for example, as shown in Patent Document 1 below, a configuration is known which includes a partition wall rubber which connects an outer attachment member and an inner attachment member and divides a main liquid chamber into a first liquid chamber having the partition member in a part of a partition wall and a second liquid chamber having a main rubber in a part of the partition wall, a dividing rubber which divides the second liquid chamber into two separate liquid chambers in a circumferential direction, a first restricted passage through which the first liquid chamber and an auxiliary liquid chamber communicate with each other, and two second restricted passages through which the two divided liquid chambers communicate with each other through the auxiliary liquid chamber.

Further, when vibration in an axial direction is input, as the fluid flows between the first liquid chamber and the auxiliary liquid chamber through the first restricted passage, the vibration is damped and absorbed. Further, when vibration in a horizontal direction intersecting the axial direction is input, as the fluid flows between the two divided liquid chambers through the second restricted passage and the auxiliary liquid chamber, the vibration is damped and absorbed.

CITATION LIST

Patent Document

[Patent Document 1]
Japanese Unexamined Patent Application, First Publication No. 2013-245722

SUMMARY OF INVENTION

Technical Problem

However, in the above-described anti-vibration device of the related art, the liquid chamber with which the first liquid chamber communicates through the first restricted passage, and the liquid chamber with which the divided liquid chamber communicates through the second restricted passage are the same auxiliary liquid chamber. Therefore, when vibration in the axial direction is input, if the liquid flowing between the first liquid chamber and the auxiliary liquid chamber through the first restricted passage flows into the second restricted passage and vibration in the horizontal direction is input, there is a possibility that the liquid flowing between the two divided liquid chambers through the second restricted passage and the auxiliary liquid chamber will flow into the first restricted passage, and thus, the generated damping force decreases, which makes it difficult to achieve the desired anti-vibration performance.

The present invention has been made in view of the above-described circumstances, and an object of the present invention is to provide an anti-vibration device capable of securing a damping force with respect to each of vibrations in the axial direction and the horizontal direction.

Solution to Problem

The anti-vibration device according to the present invention includes a cylindrical outer attachment member connected to one of a vibration generation portion and a vibration reception portion, and an inner attachment member connected to the other thereof and disposed inside of the outer attachment member; a pair of main rubber bodies which connect the outer attachment member and the inner attachment member and are disposed with an interval therebetween in an axial direction along a central axis of the outer attachment member; a partition member which divides a liquid chamber between the pair of first main rubbers into a first liquid chamber and a second liquid chamber in the axial direction; and a second main rubber which divides the first liquid chamber into a third liquid chamber using the first main rubber as a part of a partition wall, and a fourth liquid chamber using the partition member as a part of the partition wall, in which any two liquid chambers of the second liquid chamber, the third liquid chamber, fourth liquid chamber communicate with each other through a first restricted passage formed in the outer attachment member, the inner attachment member or the partition member, and the remaining one liquid chamber communicates with a fifth liquid chamber formed in the outer attachment member, the inner attachment member or the partition member, and the remaining one liquid chamber is divided into liquid chambers in a circumferential direction around the central axis, and each of the liquid chambers obtained by division in the circumferential direction and the fifth liquid chamber communicate with each other through a second restricted passage formed in the outer attachment member, the inner attachment member or the partition member.

Effects of Invention

According to the present invention, it is possible to secure a damping force with respect to each vibration in the axial direction and the horizontal direction.

DESCRIPTION OF EMBODIMENTS

Hereinafter, an anti-vibration device 10 according to an embodiment of the present invention will be described with reference to the drawings.

Figure 1:
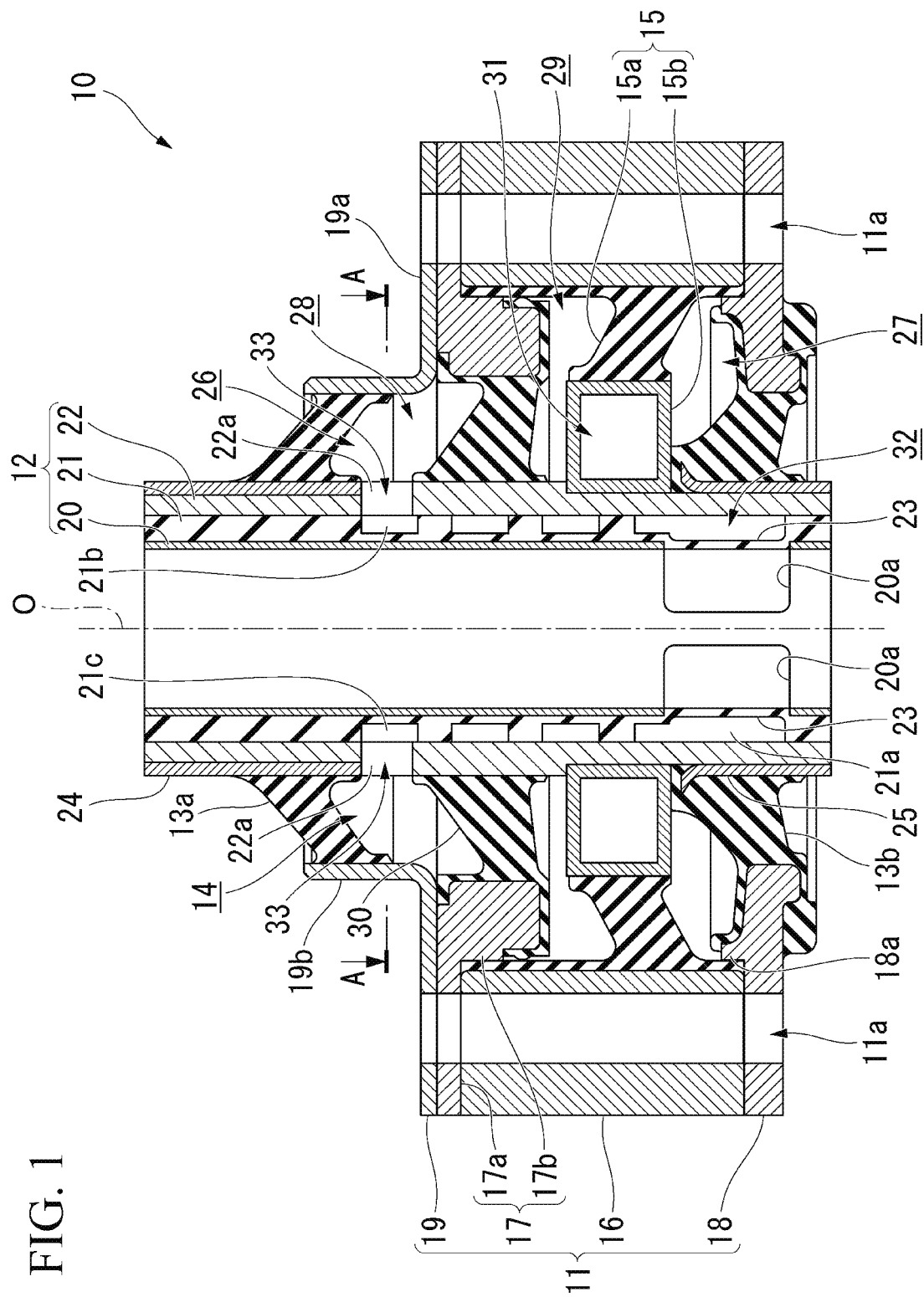
FIG. 1 is a longitudinal sectional view of an anti-vibration device according to an embodiment of the present invention.

As shown in FIG. 1, the anti-vibration device 10 includes a cylindrical outer attachment member 11 connected to one of a vibration generation portion and a vibration reception portion, an inner attachment member 12 connected to the other thereof and disposed inside of the outer attachment member 11, a pair of main rubbers 13a and 13b which connect the outer attachment member 11 and the inner attachment member 12 and are disposed at an interval in an axial direction along a central axis O of the outer attachment member 11, and a partition member 15 which divides a liquid chamber 14 between the pair of first main rubbers 13a and 13b in the axial direction.

Hereinafter, in a plan view seen from the axial direction, a direction orthogonal to the central axis O will be referred to as a radial direction, and a direction of circling around the central axis O will be referred to as a circumferential direction.

For example, ethylene glycol, water, silicone oil or the like is sealed in the liquid chamber 14. The anti-vibration device 10 is applied to, for example, a cabin mount or the like, and is used in a state in which the axial direction is directed in a vertical direction.

The outer attachment member 11 includes a cylindrical main cylinder body 16, an annular first outer member 17 disposed at an end edge on one side in the axial direction of the main cylinder body 16, an annular second outer member 18 disposed at an end edge on the other side in the axial direction of the main cylinder body 16, and an annular third outer member 19 disposed on a surface on one side in the axial direction of the first outer member 17. A plurality of mounting holes 11a which penetrate the main cylinder body 16, the first outer member 17, the second outer member 18, and the third outer member 19 integrally in the axial direction are formed in the outer attachment member 11 at intervals in the circumferential direction. The main cylinder body 16, the first outer member 17, the second outer member 18, and the third outer member 19 are integrally fixed by screwing nuts into bolts (not shown) inserted into the mounting holes 11a.

Hereinafter, one side in the axial direction will be referred to as an upper side, and the other side in the axial direction will be referred to as a lower side.

The first outer member 17 includes a first annular plate portion 17a disposed at an upper end opening edge of the main cylinder body 16, and a fitting cylinder portion 17b which protrudes downward from an inner peripheral edge of the first annular plate portion 17a and is fitted into an upper end portion of the main cylinder body 16. Both the first annular plate portion 17a and the fitting cylinder portion 17b are disposed coaxially with the central axis O.

The second outer member 18 is an annular plate body disposed at a lower end opening edge of the main cylinder body 16 and disposed coaxially with the central axis O. An inner peripheral portion of the second outer member 18 is located radially inward from an inner peripheral surface of the main cylinder body 16. In the second outer member 18, a fitting protrusion 18a protruding upward and fitted into the lower end portion of the main cylinder body 16 is formed over the entire circumference.

The third outer member 19 includes a third annular plate portion 19a disposed on the upper surface of the first outer member 17, and a protruding cylinder portion 19b protruding upward from an inner peripheral edge of the third annular plate portion 19a. Both the third annular plate portion 19a and the protruding cylinder portion 19b are disposed coaxially with the central axis O.

Further, the outer attachment member 11 may be appropriately modified such that the whole thereof is integrally formed.

The inner attachment member 12 is disposed radially inward from the outer attachment member 11. The inner attachment member 12 has a cylindrical shape and is disposed coaxially with the central axis O. Both end portions in the axial direction of the inner attachment member 12 are located axially outward from the outer attachment member 11.

The inner attachment member 12 includes a core cylinder body 20, a main body cylinder 21 that covers an outer peripheral surface of the core cylinder body 20 over the entire region, and an outer fitting cylinder 22 externally fitted to the main body cylinder 21. Lengths in the axial direction and positions in the axial direction of the main body cylinder 21, the core cylinder body 20 and the outer fitting cylinder 22 are the same as one another. The main body cylinder 21 is formed of a material having a hardness lower than those of the core cylinder body 20 and the outer fitting cylinder 22. For example, the main body cylinder 21 is formed of a soft material such as a rubber material or an elastomer, and the core cylinder body 20 and the outer fitting cylinder 22 are formed of a hard material such as a synthetic resin material or a metal material.

At a lower end portion of the core cylinder body 20, openings 20a penetrating in the radial direction are separately formed on both sides sandwiching the central axis O in the radial direction. When viewed from the outside in the radial direction, the opening 20a has a rectangular shape in which a pair of sides extend in the axial direction and a remaining pair of sides extend in the circumferential direction. The opening 20a has a rectangular shape that is longer in the circumferential direction when viewed from the outside in the radial direction. The opening 20a is located above a lower end edge of the core cylinder body 20. The outer peripheral surface of the core cylinder body 20 is bonded to the inner peripheral surface of the main body cylinder 21.

A wide annular groove 21a extending continuously over the entire circumference is formed on the outer peripheral surface of the lower end portion of the main body cylinder 21. A portion of the main body cylinder 21 which forms a groove bottom portion of the annular groove 21a is formed in a film shape having a thickness thinner than those of other portions. The annular groove 21a is disposed over the entire region of the portion of the core cylinder body 20 along the axial direction in which the opening 20a is located. A portion (hereinafter referred to as a diaphragm) 23 of the main body cylinder 21, which covers the opening 20a of the core cylinder body 20 and is formed in a film shape, is formed to be elastically deformable in the radial direction. Further, the diaphragm 23 may be separated from the inner attachment member 12.

Two spiral grooves 21b and 21c extending in a spiral shape around the central axis O are formed on the outer peripheral surface of the main body cylinder 21. The respective upper ends of the two spiral grooves 21b and 21c are separately located on both sides of the outer peripheral surface of the main body cylinder 21 sandwiching the central axis O in the radial direction, as shown in FIG. 1. The positions in the axial direction of the respective upper ends of the two spiral grooves 21b and 21c are equal to each other. The respective lower ends of the two spiral grooves 21b and 21c are separately located on both sides of the outer peripheral surface of the main body cylinder 21 sandwiching the central axis O in the radial direction. The positions in the axial direction of the respective lower ends of the two spiral grooves 21b and 21c are equal to each other, and open at the upper end portion of the annular groove 21a. The circumferential directions of the two spiral grooves 21b and 21c directed from the upper end to the lower end are the same as each other. Lengths, widths, and lead angles of each of the two spiral grooves 21b and 21c are equal to each other. In the illustrated example, the two spiral grooves 21b and 21c rotate 360° or more about the central axis O, but may rotate less than 360°.

The outer fitting cylinder 22 integrally covers the annular groove 24a and the spiral grooves 21b and 21c in the main body cylinder 21 from the outside in the radial direction. Two penetration holes 22a separately communicating with the respective upper ends of the two spiral grooves 21b and 21c are formed in the outer fitting cylinder 22.

A first intermediate cylinder 24 and a second intermediate cylinder 25 are separately externally fitted to both end portions in the axial direction of the outer fitting cylinder 22, respectively. Among the first intermediate cylinder 24 and the second intermediate cylinder 25, an outer peripheral surface of the first intermediate cylinder 24 located on the upper side is radially opposite to an inner peripheral surface of the protruding cylinder portion 19b of the third outer member 19. The first intermediate cylinder 24 is externally fitted to a portion of the outer fitting cylinder 22 located above the penetration hole 22a. Among the first intermediate cylinder 24 and the second intermediate cylinder 25, an outer peripheral surface of the second intermediate cylinder 25 located on the lower side is radially opposite to the second outer member 18.

Further, the inner attachment member 12 may be appropriately changed such that the whole thereof is integrally formed.

Among the pair of first main rubbers 13a and 13b, the upper first main rubber 13a located on the upper side is formed in an annular shape which extends downward gradually from the inner side toward the outerside in the radial direction. The radially inner end portion of the upper first rubber 13a is vulcanized and bonded to the outer peripheral surface of the first intermediate cylinder 24, and the radially outer end portion thereof is vulcanized and bonded to the inner peripheral surface of the protruding cylinder portion 19b of the third outer member 19, In the illustrated example, the upper first main rubber 13a is connected to the inner attachment member 12 via the first intermediate cylinder 24.

Among the pair of first main rubbers 13a and 13b, the lower first main rubber 131) located on the lower side is formed in an annular shape which extends downward gradually from the inner side toward the outer side in the radial direction. A radially inner end portion of the lower first main rubber 13b is vulcanized and bonded to the outer peripheral surface of the second intermediate cylinder 25, and a radially outer end portion thereof is vulcanized and bonded to the inner peripheral portion of the second outer member 18. In the illustrated example, the lower first main rubber 13b is connected to the inner attachment member 12 via the second intermediate cylinder 25.

Further, the first main rubbers 13a and 13b may be directly connected to the inner attachment member 12.

The partition member 15 has an annular shape and is disposed in the liquid chamber 14. The partition member 15 partitions the liquid chamber 14 into a first liquid chamber 26 and a second liquid chamber 27 in the axial direction. Between the first liquid chamber 26 and the second liquid chamber 27, a volume of the first liquid chamber 26 located on the upper side is greater than a volume of the second liquid chamber 27 located on the lower side. For example, the volume of the first liquid chamber 26 may be set to be equal to or less than the volume of the second liquid chamber 27, without being limited to this configuration.

The outer peripheral surface of the partition member 15 is connected to the inner peripheral surface of the outer attachment member 11, and the inner peripheral surface of the partition member 15 is connected to the outer peripheral surface of the inner attachment member 12. The partition member 15 includes an annular elastic portion 15a in which an outer end portion in the radial direction is connected to the outer attachment member 11, and a rigid portion 15b in which an inner end portion in the radial direction is connected to the inner attachment member 12. The elastic portion 15a is formed of, for example, a rubber material or the like having hardness lower than that of the rigid portion 15b. The radially inner end portion of the elastic portion 15a and the radially outer end portion of the rigid portion 15b are connected to each other. The elastic portion 15a is vulcanized and bonded to the inner peripheral surface of the main cylinder body 16 of the outer attachment member 11 and the radially outer end portion of the rigid portion 15b, and the rigid portion 15b is externally fitted to an outer fitting cylinder 22 of the inner attachment member 12. The elastic portion 15a extends downward gradually from the inner side to the outer side in the radial direction. A stepped portion formed on the outer peripheral surface of the outer fitting cylinder 22 abuts the upper surface of the radially inner end portion of the rigid portion 15b. The radially inner end portion of the lower first main rubber 13b abuts on the lower surface of the radially inner end portion of the rigid portion 15b.

A second main rubber 30 which divides the first liquid chamber 26 into a third liquid chamber 28 having the upper first main rubber 13a as a part of the partition wall and a fourth liquid chamber 29 having the partition member 15 as a part of the partition wall is included. The second main rubber 30 divides the first liquid chamber 26 in the axial direction. The respective volumes of the third liquid chamber 28, the fourth liquid chamber 29, and the second liquid chamber 27 are equal to one another.

Instead of this configuration, for example, the volumes of each of the third liquid chamber 28, the fourth liquid chamber 29, and the second liquid chamber 27 may be made different from one another. Further, the second liquid chamber 27 may be divided into a third liquid chamber having the lower first main rubber 13b as a part of the partition wall and a fourth liquid chamber having the partition member 15 as a part of the partition wall by the second main rubber 30.

The second main rubber 30 forms an annular shape and connects the outer attachment member 11 and the inner attachment member 12. The outer end portion in the radial direction of the second main rubber 30 is vulcanized and bonded to the fitting cylinder portion 17b of the first outer member 17, and the inner end portion in the radial direction thereof is vulcanized and bonded to the outer fitting cylinder 22 of the inner attachment member 12. The second main rubber 30 extends downward gradually from the inner side to the outer side in the radial direction. A gap in the axial direction is provided between the radially inner end portion of the second main rubber 30, the radially inner end portion of the upper first main rubber 13a, and each lower end portion of the first intermediate cylinder 24. A part of the outer peripheral surface of the outer fitting cylinder 22 of the inner attachment member 12 is exposed to the third liquid chamber 28 through the gap. The aforementioned penetration hole 22a is formed in a portion of the outer peripheral surface of the outer fitting cylinder 22 exposed to the third liquid chamber 28.

Furthermore, in the present embodiment, any two liquid chambers of the second liquid chamber 27, the third liquid chamber 28 and the fourth liquid chamber 29 communicate with each other through a first restricted passage 31 formed in the outer attachment member 11, the inner attachment member 12 or the partition member 15, and the remaining one liquid chamber communicates with a fifth liquid chamber 32 formed in the outer attachment member 11, the inner attachment member 12 or the partition member 15.

In the illustrated example, the first restricted passage 31 is formed in the rigid portion 15b of the partition member 15 and allows the fourth liquid chamber 29 and the second liquid chamber 27 to communicate with each other. Each of the fourth liquid chamber 29 and the second liquid chamber 27 is an annular space extending continuously over the entire circumference. The first restricted passage 31 may be formed in the outer attachment member 11 or the inner attachment member 12, may allow the fourth liquid chamber 29 and the third liquid chamber 28 to communicate with each other, or may allow the third liquid chamber 28 and the second liquid chamber 27 to communicate with each other.

The fifth liquid chamber 32 is formed in the inner attachment member 12. The fifth liquid chamber 32 is defined by covering an annular groove 21a formed on the outer peripheral surface of the main body cylinder 21 with the outer fitting cylinder 22, and has the diaphragm 23 in a part of the partition wall. The fifth liquid chamber 32 is an annular space formed between the main body cylinder 21 and the outer fitting cylinder 22 and continuously extending over the entire circumference. The diaphragm 23 is deformed to expand and contract with the inflow and outflow of the liquid to and from the fifth liquid chamber 32. The fifth liquid chamber 32 may be formed in the outer attachment member 11 or the partition member 15.

The third liquid chamber 28 is divided in the circumferential direction, and each of the divided liquid chambers 28a and 28b obtained, by division in the circumferential direction and the fifth liquid chamber 32 separately communicate with each other through the second restricted passage 33 formed in the outer attachment member 11, the inner attachment member 12 or the partition member 15.

As described above, the first restricted passage 31, the fourth liquid chamber 29, and the second liquid chamber 27 are in mutually non-communicating and independent states, and the second restricted passage 33, the respective divided liquid chambers 28a and 28b, and the fifth liquid chamber 32 are in a mutually non-communicated and independent state.

In the illustrated example, the second restricted passage 33 is formed in the inner attachment member 12. The second restricted passage 33 is configured by spiral grooves 21b and 21c covered with the outer fitting cylinder 22 and the penetration hole 22a formed in the outer fitting cylinder 22. The two second restricted passages 33 are provided.

As described above, the second restricted passage 33 and the fifth liquid chamber 32 are formed in the same member among the outer attachment member 11, the inner attachment member 12 and the partition member 15, and the aforementioned first restricted passage 31 is formed in a different member from the member in which the second restricted passage 33 and the fifth liquid chamber 32 are formed, among the outer attachment member 11, the inner attachment member 12 and the partition member 15.

Further, the second restricted passage 33 may be formed in the outer attachment member 11 or the partition member 15, and may be formed in a different member from the member in which the fifth liquid chamber 32 is formed, among the outer attachment member 11, the inner attachment member 12 and the partition member 15. Further, the first restricted passage 31 is formed in the same member as the member in which the second restricted passage 33 and the fifth liquid chamber 32 are formed, among the outer attachment member 11, the inner attachment member 12, and the partition member 15.

Figure 2:
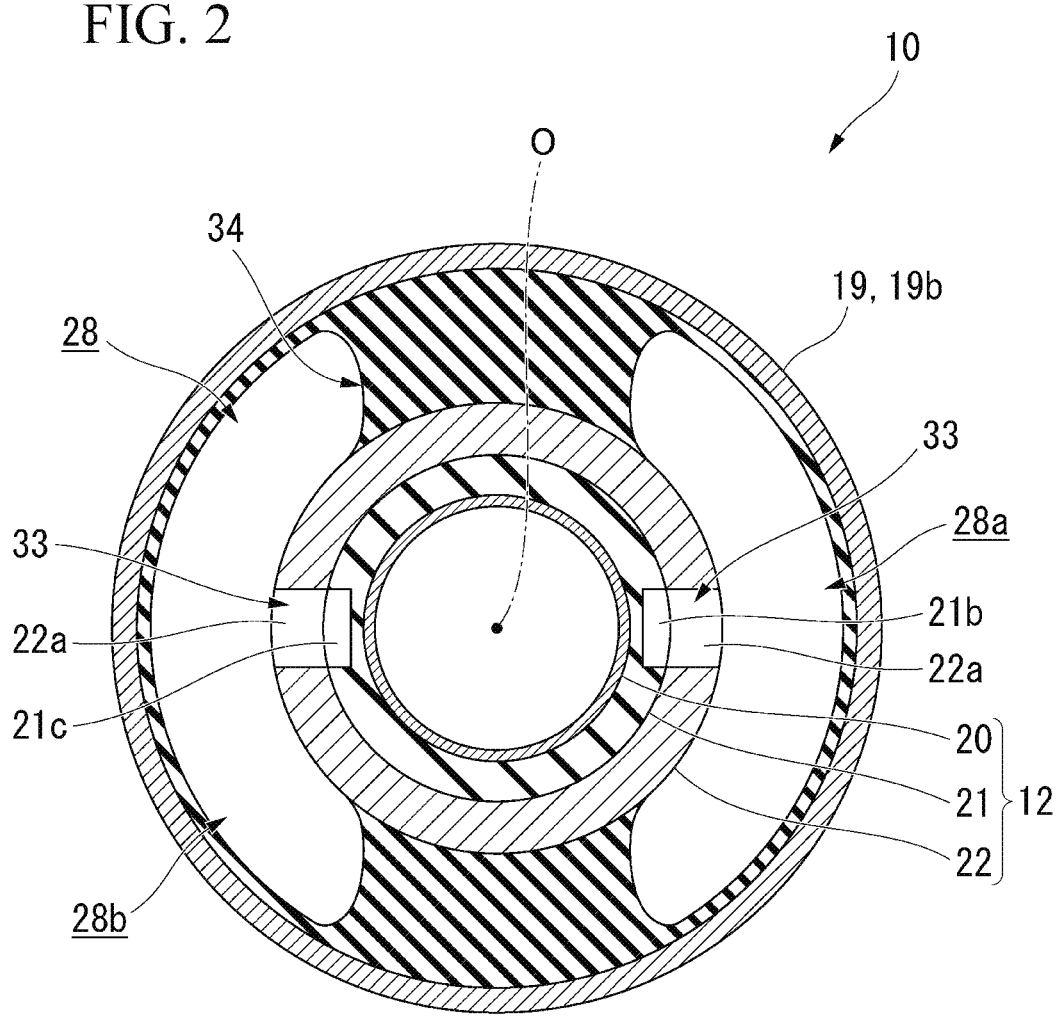
FIG. 2 is a cross-sectional view taken along a line A-A of the anti-vibration device shown in FIG. 1.
Figure 3:
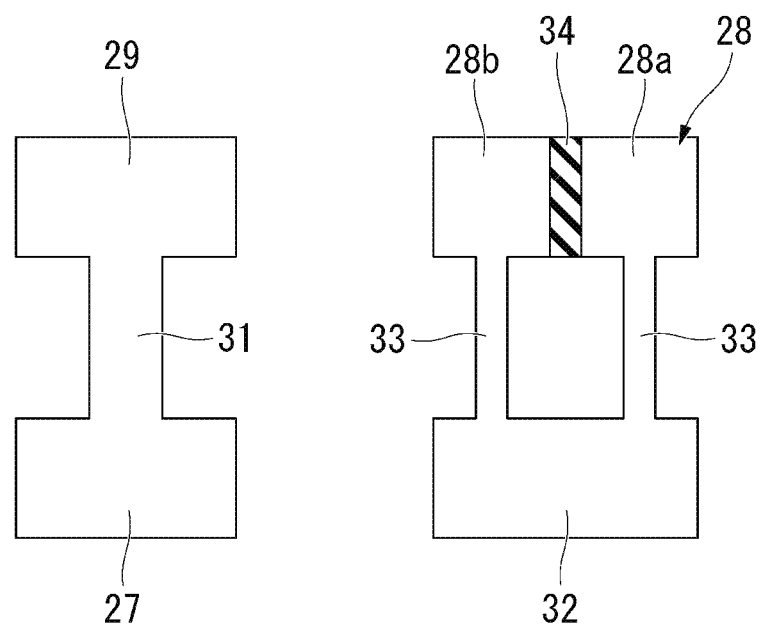
FIG. 3 is a schematic view of the anti-vibration device show in FIGS. 1 and 2.

As shown in FIG. 2, the third liquid chamber 28 is divided into two divided liquid chambers 28a and 28b in the circumferential direction by the elastic dividing member 34. The elastic dividing member 34 is formed of, for example, a rubber material or the like, and connects the portions in the inner peripheral surface of the outer attachment member 11 facing each other in the radial direction across the inner attachment member 12 in the radial direction. The elastic dividing members 34 extend in the radial direction and are disposed on the same straight line when viewed from the axial direction. The respective divided liquid chambers 28a and 28b have the same size. Each of the divided liquid chambers 28a and 28b has a symmetrical shape with respect to the straight line in a cross-sectional view orthogonal to the central axis O. The elastic dividing member 34 is formed integrally with the upper first main rubber 13a. Further, the elastic dividing member 34 may be formed integrally with the second main rubber 30.

The second restricted passage 33 allows the two divided liquid chambers 28a and 28b and the one fifth liquid chamber 32 to separately communicate with each other. The flow resistances of each of the two second restricted passages 33 may be equal to or different om each other.

In the illustrated example, a flow passage cross-sectional area of the first restricted passage 31 is greater than a flow passage cross-sectional area of the second restricted passage 33. A flow passage length of the first restricted passage 31 is shorter than a flow passage length of the second restricted passage 33. Also, the flow resistance of the first restricted passage 31 is smaller than the flow resistance of the second restricted passage 33.

Further, the flow passage cross-sectional area of the first restricted passage 31 may be equal to or less than the flow passage cross-sectional area of the second restricted passage 33, or the flow passage length of the first restricted passage 31 may be equal to or greater than the flow passage length of the second restricted passage 33. The flow resistance of the first restricted passage 31 may be equal to or greater than the flow resistance of the second restricted passage 33.

Next, the operation of the anti-vibration device 10 will be described.

When the vibration in the axial direction is input, one of the first liquid chamber 26 and the second liquid chamber 27 is compressed and deformed, and on the other hand, the other thereof is expanded and deformed. At this, the pair of first main rubbers 13a and 13b, the second main rubber 30, the elastic dividing member 34, and the elastic portion 15a of the partition member 15 all elastically deform.

Thus, the liquid flows between the fourth liquid chamber 29 and the second liquid chamber 27 through the first restricted passage 31, and on the other hand, the liquid flows separately between each of the divided liquid chamber 28a and 28b of the third liquid chamber 28 and the fifth liquid chamber 32 through the two second restricted passages 33. Therefore, a liquid column resonance occurs in the first restricted passage 31 and the second restricted passage 33, and the vibration is damped and absorbed. At this time, when the resonant frequencies in the first restricted passage 31 and the second restricted passage 33 differ from each other, attenuation characteristics can be exhibited in a wide frequency band.

Next, when a vibration in the horizontal direction intersecting the axial direction is applied, one of the respective divided liquid chambers 28a and 28b of the third liquid chamber 28 is compressed and deformed, and on the other hand, the other thereof is expanded and deformed.

Thus, the liquid flows from one of the two divided liquid chambers 28a and 28b toward the fifth liquid chamber 32 through one of the two second restricted passages 33, and the liquid flows from the fifth liquid chamber 32 to other of the two divided liquid chambers 28a and 28b through the other of the two second restricted passages 33. Therefore, a liquid column resonance occurs in the two second restricted passages 33, and the vibration is damped and absorbed.

As described above, according to the anti-vibration device 10 according to the present embodiment, among the fourth liquid chamber 29 and the second liquid chamber 27 communicating with each other through the first restricted passage 31, and the respective divided liquid chambers 28a and 28h and the fifth liquid chamber 32 separately communicating with each other through the second restricted passage 33, a common liquid chamber is eliminated, the first restricted passage 31, the fourth liquid chamber 29 and the second liquid chamber 27 can be made independent of each other in a non-communication state, and the second restriction passage 33, the respective divided liquid chambers 28a and 28b and the fifth liquid chamber 32 can be made independent of each other in a non-communication state. Therefore, when the vibration is input, it is possible to prevent the liquid flowing between the fourth liquid chamber 29 and the second liquid chamber 27 through the first restricted passage 31 from flowing into the second restricted passage 33, or it is possible to prevent the liquid flowing between the respective divided liquid chambers 28a and 28b through the second restricted passage 33 and the fifth liquid chamber 32 from flowing into the first restricted passage 31, and the damping force can be secured both at the time of the input of the axial vibration and at the time of the input of the horizontal vibration.

Since the fifth liquid chamber 32, which is one of the four liquid chambers 27, 28, 29 and 32 included in the anti-vibration device 10, is formed in one of the outer attachment member 11, the inner attachment member 12 and the partition member 15 which are the existing members, it is possible to achieve a configuration in which the first restricted passage 31, the fourth liquid chamber 29 and the second liquid chamber 27 are independent of each other, and the second restricted passage 33, the respective divided liquid chambers 28a and 28b, and the fifth liquid chamber 32 are independent of each other, while suppressing increases in size of the anti-vibration device 10 and the number of components.

The fifth liquid chamber 32 formed in one of the outer attachment member 11, the inner attachment member 12 and the partition member 15 separately communicates with the respective liquid chambers 28a and 28b divided in the circumferential direction through the second restricted passage 33. Thus, it is possible to suppress the internal volume of the fifth liquid chamber 32 required to exhibit the expected anti-vibration performance to a low level, and it is possible to easily and reliably achieve the anti-vibration device 10 that exhibits the above-mentioned operation effect, while suppressing the design change of the existing members.

Since the partition member 15 is interposed between the fourth liquid chamber 29 and the second liquid chamber 27 with which the first restricted, passage 31 communicates, it is possible to generate a large liquid pressure difference between the fourth liquid chamber 29 and the second liquid chamber 27 at the time of the input of the axial vibration, and a high damping force can be reliably generated.

Since the second restricted passage 33 and the fifth liquid chamber 32 communicating with each other are formed in the same member among the outer attachment member 11, the inner attachment member 12 and the partition member 15, it is possible to suppress an increase in size and complexity of the anti-vibration device 10. Further, the first restricted passage 31 is formed in a different member from the member in which the second restricted passage 33 and the fifth liquid chamber 32 are formed, among the outer attachment member 11, the inner attachment member 12 and the partition member 15. Therefore, the complexity of the anti-vibration device 10 can be reliably suppressed.

Since a part of the partition wall of the fifth liquid chamber 32 communicating with the respective divided liquid chambers 28a and 28b through the second restricted passage 33 is the diaphragm 23, when the vibration in the horizontal direction is input, the liquid pressure of each of the divided liquid chambers 28a and 28b fluctuates, and on the other hand, the liquid pressure of the fifth liquid chamber 32 with which the respective divided liquid chambers 28a and 28b communicate together does not fluctuate. Therefore, it is possible to suppress the damping force generated at the time of the input of the horizontal vibration from becoming excessively high, and for example, to improve the riding comfort when the vibration in the horizontal direction is input.

The technical scope of the present invention is not limited to the above embodiment, and various modifications can be made without departing from the scope of the present invention.

For example, although the configuration in which the partition member 15 includes the elastic portion 15a and the rigid portion 15b is shown in the above embodiment, the present invention is not limited to such an aspect, and for example, a configuration including only the rigid portion may be adopted.

Although the configuration in which the anti-vibration device 10 is divided into three liquid chambers of the second liquid chamber 27, the third liquid chamber 28 and the fourth liquid chamber 29 in the axial direction is shown in the above embodiment, the present invention is also applicable to a configuration in which the anti-vibration device 10 is divided into four or more liquid chambers.

Although the configuration in which the third liquid chamber 28 is divided into two chambers in the circumferential direction, and two second restricted passages 33 are provided is shown in the above embodiment, the present invention is also applicable to a configuration in which the third liquid chamber 28 is divided into three or more chambers in the circumferential direction, and the three or more second restricted passages 33 are provided.

The configuration in which the third liquid chamber 28 is divided into two chambers in the circumferential direction, and each of the liquid chambers divided in the circumferential direction and the fifth liquid chamber 32 separately communicate with each other through the second restricted passage 33 is shown in the above embodiment. However, the second liquid chamber 27 or the fourth liquid chamber 29 may be divided in the circumferential direction, and each of the liquid chambers divided in the circumferential direction and the fifth liquid chamber 32 may separately communicate with each other through the second restricted passage 33.

Although the configuration in which a part of the partition wall of the fifth liquid chamber 32 has the diaphragm 23 is shown in the above embodiment, a configuration having no diaphragm 23 may be adopted.

The anti-vibration device 10 is not limited to a cabin mount of a vehicle, and is also applicable to parts other than the cabin mount. For example, it is also possible to apply the anti-vibration device 10 to engine mounts and bushes for vehicles, and mounts of generators mounted on construction machines, or it is also possible to apply the anti-vibration device 10 to mounts of machines installed in factories and the like.

In addition, it is possible to appropriately replace constituent elements of the aforementioned embodiment with known constituent elements without departing from the spirit of the present invention, and the above-described modified examples may be combined as appropriate.

According to the present invention, when the vibration in the axial direction is input, by allowing the liquid to flow between the two liquid chambers through the first restricted passage, and to flow between the remaining one liquid chamber and the fifth liquid chamber through the second restricted passage, vibration can be damped and absorbed.

When the vibration in the horizontal direction intersecting the axial direction is input, since the remaining one liquid chamber is divided in the circumferential direction, by allowing the liquid to flow between the respective liquid chambers (hereinafter referred to as divided liquid chambers) through the second restricted passage and the fifth liquid chamber, the vibration can be damped and absorbed.

Among the two liquid chambers communicating with each other through the first restricted passage, and the respective divided liquid chambers and the fifth liquid chamber separately communicating with each other through the second restricted passage, a common liquid chamber is eliminated, the first restricted passage and the two liquid chambers can be made independent of each other in a non-communication state, and the second restricted passage, the respective divided liquid chambers and the fifth liquid chamber can be made independent of each other in a non-communication state. Therefore, when the vibration is input, it is possible to prevent the liquid flowing between the two liquid chambers through the first restricted passage from flowing into the second restricted passage, or it is possible to prevent the liquid flowing between the respective divided liquid chambers through the second restricted passage and the fifth liquid chamber from flowing into the first restricted passage. The damping force can be secured both at the time of the input of the axial vibration and at the time of the input of the horizontal vibration.

Since the fifth liquid chamber, which is one of the four liquid chambers included in the anti-vibration device, is formed in one of the outer attachment member, the inner attachment member and the partition member which are the existing members, it is possible to achieve a configuration in which the first restricted passage and the two liquid chambers are independent of each other, and the second restricted passage, the respective divided liquid chambers and the fifth liquid chamber are independent of each other, while suppressing increases in size of the anti-vibration device and the number of components.

The fifth liquid chamber formed in one of the outer attachment member, the inner attachment member and the partition member separately communicates with the respective liquid chambers divided in the circumferential direction through the second-restricted passage. Thus, it is possible to suppress an internal volume of the fifth liquid chamber required to exhibit the expected anti-vibration performance to a low level, and it is possible to easily and reliably achieve the anti-vibration device that exhibits the above-mentioned operation effect, while suppressing the design change of the existing members.

Here, the first restricted passage may allow the third liquid chamber or the fourth liquid chamber to communicate with the second liquid chamber.

In this case, since the partition member is interposed between the third liquid chamber or the fourth liquid chamber and the second liquid chamber with which the first restricted passage communicates, it is possible to generate a large liquid pressure difference between the third liquid chamber or the fourth liquid chamber and the second liquid chamber at the time of the input of the axial vibration, and a high damping force can be reliably generated.

Further, the second restricted passage and the fifth liquid chamber may be formed in the same member among the outer attachment member, the inner attachment member and the partition member, and the first restricted passage may be formed in a different member from the member in which the second restricted passage and the fifth liquid chamber are formed, among the outer attachment member, the inner attachment member and the partition member.

In this case, since the second restricted passage and the fifth liquid chamber which communicate with each other are formed in the same member among the outer attachment member, the inner attachment member and the partition member, it is possible to suppress an increase in size and complexity of the anti-vibration device. Also, since the first restricted passage is formed in a different member from the member in which the second restricted passage and the fifth liquid chamber are formed among the outer attachment member, the inner attachment member and the partition member, complexity of the anti-vibration device can be reliably suppressed.

In addition, a diaphragm that forms a part of the partition wall of the fifth liquid chamber may be provided.

In this case, since a part of the partition wall of the fifth liquid chamber communicating with the respective divided liquid chambers through the second restricted passage is the diaphragm, when the vibration in the horizontal direction is input, the liquid pressure of each of the divided liquid chambers fluctuates, and on the other hand, the liquid pressure of the fifth liquid chamber with which the respective divided liquid chambers communicate together does not fluctuate. Therefore, it is possible to suppress the damping force generated at the time of the input of the vibration in the horizontal direction from becoming excessively high, and for example, to improve the riding comfort when the vibration in the horizontal direction is input.

INDUSTRIAL APPLICABILITY

According to the present invention, it is possible to secure damping forces with respect to each vibration in the axial direction and the horizontal direction.

REFERENCE SIGNS LIST

10 Anti-vibration device
11 Outer attachment member
12 Inner attachment member
13a, 13b First main rubber
14 Liquid chamber
15 Partition member
23 Diaphragm
27 Second liquid chamber
28 Third liquid chamber
29 Fourth liquid chamber
30 Second main rubber
31 First restricted passage
32 Fifth liquid chamber
33 Second restricted passage
O Central axis

The invention claimed is:

1. An anti-vibration device, comprising:
a cylindrical outer attachment member connected to one of a vibration generation portion and a vibration reception portion, and an inner attachment member connected to the other thereof and disposed inside of the outer attachment member;
a pair of first main rubbers which connect the outer attachment member and the inner attachment member and are disposed at an interval in an axial direction along a central axis of the outer attachment member;
a partition member which divides a liquid chamber between the pair of first main rubbers into a first liquid chamber and a second liquid chamber in the axial direction; and
a second main rubber which divides the first liquid chamber into a third liquid chamber using the first main rubber as a part of a partition wall, and a fourth liquid chamber using the partition member as a part of the partition wall,
wherein any two liquid chambers of the second liquid chamber, the third liquid chamber, and the fourth liquid chamber communicate with each other through a first restricted passage formed in the outer attachment member, the inner attachment member or the partition member, and a remaining one liquid chamber of the second liquid chamber, the third liquid chamber, and the fourth liquid chamber communicates with a fifth liquid chamber formed in the outer attachment member, the inner attachment member or the partition member, the remaining one liquid chamber is divided into liquid chambers in a circumferential direction around the central axis, and each of the liquid chambers divided in the circumferential direction and the fifth liquid chamber communicate with each other through a second restricted passage formed in the outer attachment member, the inner attachment member or the partition member, and
the any two liquid chambers do not communicate with the remaining one liquid chamber and the fifth liquid chamber.

2. The anti-vibration device according to claim 1, wherein the first restricted passage allows the third liquid chamber or the fourth liquid chamber and the second liquid chamber to communicate with each other.

3. The anti-vibration device according to claim 1, wherein the second restricted passage and the fifth liquid chamber are formed in the same member among the outer attachment member, the inner attachment member and the partition member, and
the first restricted passage is formed in a different member from the member in which the second restricted passage and the fifth liquid chamber are formed, among the outer attachment member, the inner attachment member and the partition member.

4. The anti-vibration device according to claim 1, further comprising:
a diaphragm which forms a part of a partition wall of the fifth liquid chamber.

5. The anti-vibration device according to claim 2, wherein the second restricted passage and the fifth liquid chamber are formed in the same member among the outer attachment member, the inner attachment member and the partition member, and
the first restricted passage is formed in a different member from the member in which the second restricted passage and the fifth liquid chamber are formed, among the outer attachment member, the inner attachment member and the partition member.

6. The anti-vibration device according to claim 2, further comprising:
a diaphragm which forms a part of a partition wall of the fifth liquid chamber.

7. The anti-vibration device according to claim 3, further comprising:
a diaphragm which forms a part of a partition wall of the fifth liquid chamber.

8. The anti-vibration device according to claim 5, further comprising:
a diaphragm which forms a part of a partition wall of the fifth liquid chamber.

* * * * *